US012666517B2

(12) United States Patent
Yang

(10) Patent No.: US 12,666,517 B2
(45) Date of Patent: Jun. 23, 2026

(54) BIDIRECTIONALLY ILLUMINATING LIGHT SOURCE TRIGGERED BY POWER-LINE PULSE SIGNALS, A LIGHT STRING, AND A CONTROL APPARATUS

(71) Applicant: HANGZHOU YUN LED CHIP PHOTOELECTRICITY TECH. CO., LTD., Hangzhou (CN)

(72) Inventor: Yinghan Yang, Hangzhou (CN)

(73) Assignee: HANGZHOU YUN LED CHIP PHOTOELECTRICITY TECH. CO., LTD., Hangzhou (CN)

( * ) Notice: Subject to any disclaimer, the term of this patent is extended or adjusted under 35 U.S.C. 154(b) by 108 days.

(21) Appl. No.: 18/732,011

(22) Filed: Jun. 3, 2024

(65) Prior Publication Data

US 2024/0324086 A1 Sep. 26, 2024

Related U.S. Application Data

(63) Continuation of application No. PCT/CN2022/137746, filed on Dec. 9, 2022.

(30) Foreign Application Priority Data

Dec. 29, 2021 (CN) ......................... 202111640375.0
Dec. 29, 2021 (CN) ......................... 202123393097.1
May 7, 2022 (CN) ......................... 202210494419.1

(51) Int. Cl.
*H05B 47/185* (2020.01)
*H05B 45/20* (2020.01)

(52) U.S. Cl.
CPC ........... *H05B 47/185* (2020.01); *H05B 45/20* (2020.01)

(58) Field of Classification Search
CPC .............................. H05B 47/185; H05B 45/20
See application file for complete search history.

(56) References Cited

U.S. PATENT DOCUMENTS

| | | | | |
|---|---|---|---|---|
| 9,402,288 | B2 * | 7/2016 | Xu | H05B 45/37 |
| 10,806,002 | B2 * | 10/2020 | Herrmann | B60Q 9/008 |
| 2008/0211421 | A1 * | 9/2008 | Lee | H05B 45/14 315/250 |
| 2014/0361697 | A1 * | 12/2014 | Miskin | H05B 45/46 315/192 |

* cited by examiner

*Primary Examiner* — Minh Tran
(74) *Attorney, Agent, or Firm* — Syncoda LLC; Feng Ma

(57) ABSTRACT

A bidirectionally illuminating light source triggered by power-line pulse signals includes a first light emitting module triggered by power-line pulse signals and a reverse light emitting module, which are connected in parallel between a first port and a second port of the power lines. The first light emitting module triggered by power-line pulse signals comprises an LED color light group and an LED driver. When the voltage level of the first port of the power lines is higher than that of the second port, the LED driver drives the LED color light group according to the power-line pulse signals loaded on the power lines; when the voltage level of the first port of the power lines is lower than that of the second port, the reverse light emitting module operates. A bidirectional emitting light string and control apparatus triggered by power-line pulses are also provided.

24 Claims, 8 Drawing Sheets

BIDIRECTIONALLY ILLUMINATING LIGHT SOURCE TRIGGERED BY POWER-LINE PULSE SIGNALS, A LIGHT STRING, AND A CONTROL APPARATUS

CROSS-REFERENCE TO RELATED APPLICATIONS

This is a continuation of International Patent Application No. PCT/CN2022/137746 filed on Dec. 9, 2022, which claims priority to Chinese Patent Application No. 202111640375.0 filed on Dec. 29, 2021, Chinese Patent Application No. 202123393097.1 filed on Dec. 29, 2021, and Chinese Patent Application No. 202210494419.1 filed on May 7, 2022. The disclosures of the above-referenced applications are hereby incorporated by reference in their entirety.

BACKGROUND

The present invention relates to the field of LED color lights, and more specifically, to a bidirectionally illuminating light source triggered by power-line pulse signals, a bidirectionally illuminating light string, and a bidirectionally illuminating control apparatus.

Currently, there are "Arithmetic Operation Apparatus and LED Driver Triggered by Power-Line Edge Signal" and "Color Light apparatus Based on Power-Line Edge Signal Control" (Chinese invention patents ZL201410632645.7 and ZL201410775449.5) appearing on the market. Due to their high cost-effectiveness, these patented technologies have achieved large-scale industrial applications.

By transmitting control signals through the power lines, a controllable colorful LED light apparatus can be achieved without the need for an additional control signal wire, with only a power wire and a ground wire required. LEDs and a power-line carrier control chip are packaged together to form a controllable colorful LED module with the same appearance as a normal LED, greatly simplifying the production of the final product and improving its performance.

Currently, the controllable colorful LED modules and the colorful light apparatus controlled by the power-line signals can only conduct current in one direction, from one fixed end to the other, and do not allow reverse current, which cannot drive LEDs of other color ranges through reverse current to achieve more wide spectral effect. Especially in the case of RGB, allowing for reverse current to increase warm white color is not possible.

SUMMARY

Various embodiments of the present disclosure provide a bidirectionally illuminating light source triggered by power-line pulse signals, which can further expand the spectral range of the light source by allowing forward and reverse currents with only a power wire and a ground wire. The present invention also provides a bidirectionally illuminating light string triggered by power-line pulse signals and a bidirectionally illuminating control apparatus triggered by power-line pulse signals, both of which include the aforementioned light sources.

A bidirectionally illuminating light source triggered by power-line pulse signals, includes: a first light emitting module triggered by power-line pulse signals and a reverse light emitting module, which are connected in parallel between a first port and a second port of the power lines; the first light emitting module triggered by power-line pulse signals includes an LED color light group and an LED driver that drives the LED color light group according to the power-line pulse signals loaded on the power lines; when the voltage level of the first port of the power lines is higher than that of the second port, the LED driver drives the LED color light group according to the power-line pulse signals loaded on the power lines; when the voltage level of the first port of the power lines is lower than that of the second port, the reverse light emitting module operates.

The first light emitting module triggered by power-line pulse signals and the reverse light emitting module can be packaged together, soldered together with other carriers, or connected together with wires of various lengths.

It should be understood that the reverse light emitting module can operate in a constant mode or a controlled dynamic mode.

The LED driver includes a reverse current blocking module and an operation module triggered by power-line pulse signals.

When the voltage level of the first port of the power lines is higher than that of the second port, the first light emitting module triggered by power-line pulse signals drives the LED color light group according to the power-line pulse signals loaded on the first port, or the second port, or the combination of the first port and the second port.

The power-line pulse signals can be high pulse effective, low pulse effective, or a combination of high and low pulses. As a preferred embodiment, the low level of the power-line pulse signals is equal to the voltage level of the second port of the power lines; as another embodiment, the low level of the power-line pulse signals is a third voltage level that is higher than the voltage level of the second port and lower than the voltage level of the first port.

The input of the reverse current blocking module is connected to the first port of the power lines, and the output of the reverse current blocking module is connected to the operation module triggered by power-line pulse signals. The ground of the operation module triggered by power-line pulse signals is connected to the second port of the power lines, and the operation module triggered by power-line pulse signals drives the LED color light group according to the operation result.

As a preferred embodiment, a pull-down resistor is connected between the output of the reverse current blocking module and the ground of the operation module triggered by power-line pulse signals.

As a preferred embodiment, the LED color light group can be connected in a common anode configuration, with the cathodes of the LEDs in the color light group connected to the output of the operation module triggered by power-line pulse signals. The common anode of the LED color light group can be connected to the output of the reverse current blocking module, or it can be connected to the input of the reverse current blocking module. As another embodiment, the LED color light group can be connected in a common cathode configuration, with the anodes of the LEDs in the color light group connected to the output of the operation module triggered by power-line pulse signals, and the common cathode of the LED color light group connected to the second port of the power lines.

As a preferred embodiment, the operation module triggered by power-line pulse signals performs computation triggered by the pulse signals, and drives the color light group according to the computation results. The computation can be understood as a change in the internal state of the operation module triggered by power-line pulse signals, or can involve arithmetic operations, logical operations, or a combination of both. As a preferred embodiment, the operation module triggered by power-line pulse signals performs pulse counting computation triggered by the pulse signals. As another embodiment, the operation module triggered by power-line pulse signals performs encoding and decoding computation triggered by the pulse signals, with the pulse width of high or low levels corresponding to encoded information. Different lengths of high levels, or different lengths of low levels, or combinations of different lengths of high and low levels, represent different logical encoding information. As a preferred embodiment, a high pulse with a length less than 100 μs corresponds to logic 0, while a high pulse with a length greater than or equal to 100 μs corresponds to logic 1. As another embodiment, the operation module triggered by power-line pulse signals performs modulation and demodulation computation based on the current or voltage frequency triggered by the pulse signals, and drives the LED color light group according to the modulation and demodulation computation result. Furthermore, it should be understood that the pulse signals triggering computation can be triggered by a single pulse signal or a combination of multiple pulse signals.

As a preferred embodiment, the reverse current blocking module can be a single device or a combination of multiple devices. The reverse current blocking module can be a resistor that limits the reverse current to less than 500 mA.

As a preferred embodiment, the reverse current blocking module is a unidirectional conducting module. The reverse current blocking module is conducting when the input voltage of the reverse current blocking module is higher than the output voltage of the reverse current blocking module, and the reverse current blocking module is turn off when the input voltage is lower than the output voltage of the reverse current blocking module.

As a preferred embodiment, the unidirectional conducting module is a diode, with the anode of the diode connected to the first port of the power lines and the cathode connected to the operation module triggered by power-line pulse signals. Alternatively, the unidirectional conducting module can be an equivalent diode formed by an NPN transistor, with the collector and base of the NPN transistor connected to the first port of the power lines, and the emitter connected to the operation module triggered by power-line pulse signals. Alternatively, the unidirectional conducting module can be an equivalent diode formed by a PNP transistor, with the collector and base of the PNP transistor connected to the operation module triggered by power-line pulse signals, and the emitter connected to the first port of the power lines.

As a preferred embodiment, the reverse current blocking module and the operation module triggered by power-line pulse signals are integrated in a same integrated circuit. Alternatively, the reverse current blocking module and the operation module triggered by power-line pulse signals can be completed by different independent modules.

As a preferred embodiment, the reverse light-emitting module is composed of a plurality of LEDs. Furthermore, the plurality of LEDs can be one or more than two. The plurality of LEDs can be in a parallel structure, or in a series-parallel structure. As a preferred embodiment, the reverse light-emitting module can be in a warm white color.

As another embodiment, the reverse light-emitting module is a second light-emitting module triggered by power-line pulse signals. When the voltage level of the first port of the power lines is lower than that of the second port of the power lines, the second light-emitting module triggered by power-line pulse signals is driven by the power-line pulse signals loaded on the power lines, and drives an LED color light group of the second light-emitting module triggered by power-line pulse signals. As a preferred embodiment, the structure of the second light-emitting module triggered by power-line pulse signals is the same as that of the first light-emitting module triggered by power-line pulse signals.

As a preferred embodiment, the LED color light group of the second light-emitting module triggered by power-line pulse signals is in a different color series from that of the LED color light group of the first light-emitting module triggered by power-line pulse signals. As a preferred embodiment, the LED color light group of the second light-emitting module triggered by power-line pulse signals is in a warm white, golden yellow, or cool white color series.

As a preferred embodiment, the operation module triggered by power-line pulse signals includes: a pulse-triggered operation unit, which performs operations triggered by the pulse signals from the power lines and outputs the operation results; a charging unit, which provides a power supply voltage to the pulse-triggered operation unit according to the pulse signals from the power lines. It charges when the pulse signals are high and discharges when the pulse signals are low; an initialization unit, which initializes the pulse-triggered operation unit according to the power supply voltage.

In this invention, those units of the operation module triggered by power-line pulse signals can be integrated into an operation chip.

Through initialization, the pulse-triggered operation unit can be set to any number, as required, usually set to “zero” (i.e., clear).

When the power-line pulse signals are high, the charging unit is charged. When the voltage level provided by the charging unit reaches a high level, both the pulse-triggered operation unit and the initialization unit are powered on successfully.

The pulse-triggered operation unit can perform counting operations, arithmetic operations, logic operations, or shift operations, or any combination of these operations formed by counting, arithmetic, logic, and shift operations.

As a preferred embodiment, the pulse-triggered operation unit is a pulse counting unit, which counts the pulses of the pulse signals from the power lines and outputs the counting result.

The pulse counting unit includes a plurality of flip-flops, and the counting result is output from the output port of the flip-flops.

As a preferred embodiment, the flip-flops are D flip-flops.

As a preferred embodiment, the pulse counting unit includes a plurality of D flip-flops connected in series to output the counting result from the output port of the D flip-flops. Specifically: the clock signal input port of the first D flip-flop is connected to the power wire, and for each pair of adjacent D flip-flops, the clock signal input port of the next D flip-flop is connected to the inverse output port of the previous D flip-flop; the reset ports of each D flip-flop are connected to the initialization unit, and the inverse output ports of each D flip-flop are connected to the trigger ports.

The present invention also provides a bidirectional emitting light string triggered by power-line pulses, which includes a plurality of the aforementioned light sources connected to a first port of the light string and a second port of the light string. The plurality of aforementioned light sources can be connected in parallel, in a series-parallel structure, or in a parallel-series structure. The plurality of aforementioned light sources can be one or more than two.

The present invention further provides a bidirectional emitting control apparatus triggered by power-line pulses, which includes an aforementioned bidirectional emitting light string triggered by power-line pulses, a first controllable switch, a second controllable switch, a third controllable switch, and a fourth controllable switch; the first controllable switch, the second controllable switch, the third controllable switch, and the fourth controllable switch are controlled by a control circuit; the input port of the first controllable switch is connected to a DC power supply, the output port of the first controllable switch is connected to the first port of the bidirectional emitting light string triggered by power-line pulses, and the control port of the first controllable switch is connected to the control circuit; the output port of the second controllable switch is connected to the first port of the bidirectional emitting light string triggered by power-line pulses, the input port of the second controllable switch is connected to ground, and the control port of the second controllable switch is connected to the control circuit; the input port of the third controllable switch is connected to the DC power supply, the output port of the third controllable switch is connected to the second port of the bidirectional emitting light string triggered by power-line pulses, and the control port of the third controllable switch is connected to the control circuit; the output port of the fourth controllable switch is connected to the second port of the bidirectional emitting light string triggered by power-line pulses, the input port of the fourth controllable switch is connected to ground, and the control port of the fourth controllable switch is connected to the control circuit.

It should be understood that adding resistance to limit current between the ports of the controllable switch and their corresponding connection ports, and adding capacitance to the ports of the controllable switch is allowed.

As a preferred embodiment, when the second controllable switch and third controllable switch are turned off, the control circuit controls the first controllable switch between on and off to control the first light emitting modules triggered by power-line pulse signals of the bidirectional emitting light string triggered by power-line pulses.

As a preferred embodiment, when the second and third controllable switches are turned off and the first controllable switch is turned on, the control circuit controls the fourth controllable switch between on and off to control the first light emitting modules triggered by power-line pulse signals of the bidirectional emitting light string triggered by power-line pulses.

When the first controllable switch and the fourth controllable switch are turned off, and the second controllable switch and the third controllable switch are turned on, the reverse light emitting modules work in the bidirectional emitting light string triggered by power-line pulses.

As a preferred embodiment, the first and third controllable switches in the bidirectional emitting control apparatus are PMOS devices, and the second and fourth controllable switches are NMOS devices.

As a preferred embodiment, the first and third controllable switches in the bidirectional emitting control apparatus are controllable switch modules, and the second and fourth controllable switches are NMOS devices.

The controllable switch module includes PMOS P1, NMOS N1, resistor R1, and resistor R2. The source of PMOS P1 serves as the input port of the controllable switch module, and the drain of PMOS P1 serves as the output port of the controllable switch module. The source of PMOS P1 is connected to one port of resistor R1, and the other port of resistor R1 is connected to the gate of PMOS P1 and one port of resistor R2. The other port of resistor R2 is connected to the drain of NMOS N1, and the gate of NMOS N1 serves as the control port of the controllable switch module. The source of NMOS N1 is connected to ground.

The drain of NMOS device serves as the output port of the second/fourth controllable switches, the source of NMOS device serves as the input port of the second/fourth controllable switches, and the gate of NMOS device serves as the control port of the second/fourth controllable switches.

As a preferred embodiment, the fourth controllable switch includes a first N-type controllable switch, a second N-type controllable switch, and a current-limiting resistor: the first N-type controllable switch includes a control port, an input port, and an output port. The control port of the first N-type controllable switch is electrically connected to the control circuit. The input port of the first N-type controllable switch serves as the input port of the fourth controllable switch, and the output port of the N-type controllable switch is connected to ground; the second N-type controllable switch includes a control port, an input port, and an output port. The control port of the second N-type controllable switch is electrically connected to the control circuit, and the output port of the second N-type controllable switch is connected to ground.

One port of the current-limiting resistor is connected to the input port of the first N-type controllable switch, and the other port of the current-limiting resistor is connected to the input port of the second N-type controllable switch.

In some embodiments, the second and third controllable switches are turned off and the first controllable switch is turned on, the control circuit controls the fourth controllable switch between on and off to control the first light emitting modules triggered by power-line pulse signals of the bidirectional emitting light string triggered by power-line pulses.

In some embodiments, the fourth controllable switch includes a first N-type controllable switch, a second N-type controllable switch, and a current-limiting resistor; the first N-type controllable switch includes a control port, an input port, and an output port; the control port of the first N-type controllable switch is electrically connected to the control circuit; the input port of the first N-type controllable switch serves as the input port of the fourth controllable switch, and the output port of the N-type controllable switch is connected to ground, the second N-type controllable switch includes a control port, an input port, and an output port; the control port of the second N-type controllable switch is electrically connected to the control circuit, and the output port of the second N-type controllable switch is connected to ground; one port of the current-limiting resistor is connected to the input port of the first N-type controllable switch, and the other port of the current-limiting resistor is connected to the input port of the second N-type controllable switch.

In some embodiments, the first and third controllable switches in the bidirectional emitting control apparatus are controllable switch modules, and the second and fourth controllable switches are NMOS devices; the controllable switch module includes PMOS P1, NMOS N1, resistor R1, and resistor R2; the source of PMOS P1 serves as the input port of the controllable switch module, and the drain of PMOS P1 serves as the output port of the controllable switch module; the source of PMOS P1 is connected to one port of resistor R1, and the other port of resistor R1 is connected to the gate of PMOS P1 and one port of resistor R2; the other port of resistor R2 is connected to the drain of NMOS N1, and the gate of NMOS N1 serves as the control port of the controllable switch module; the source of NMOS N1 is connected to ground; the drain of NMOS device serves as the output port of the second/fourth controllable switches, the source of NMOS device serves as the input port of the second/fourth controllable switches, and the gate of NMOS device serves as the control port of the second/fourth controllable switches.

The present invention drives LED color light groups of a first light emitting module triggered by power-line pulse signals and a reverse light emitting module, and combines them to obtains a wide spectrum effect. Furthermore, the present invention drives LED color light groups of a first light emitting module triggered by power-line pulse signals and a second light-emitting module triggered by power-line pulse signals, and combines them to obtain a wider spectrum effect. The present invention also provides a bidirectional emitting light string triggered by power-line pulses and a bidirectional emitting control apparatus triggered by power-line pulses that include the aforementioned light sources. Compared with some implementations, the present invention uses bidirectional power supply, obtains one spectrum range through forward current operation triggered by power-line pulse signals, and adds another spectrum range through reverse current, greatly increasing the spectrum range of the light source, light string, and its control apparatus with only two power wires.

BRIEF DESCRIPTION OF DRAWINGS

To more clearly illustrate the embodiments of the disclosure, the following is a brief description of the drawings, which are for illustrative purpose only. For those of ordinary skills in the art, other drawings of other embodiments can become apparent based on these drawings.

DETAILED DESCRIPTION

In the following, with reference to the drawings of embodiments disclosed herein, the technical solutions of the embodiments of the disclosure will be described in a clear and fully understandable way.

Embodiment 1

Figure 1:
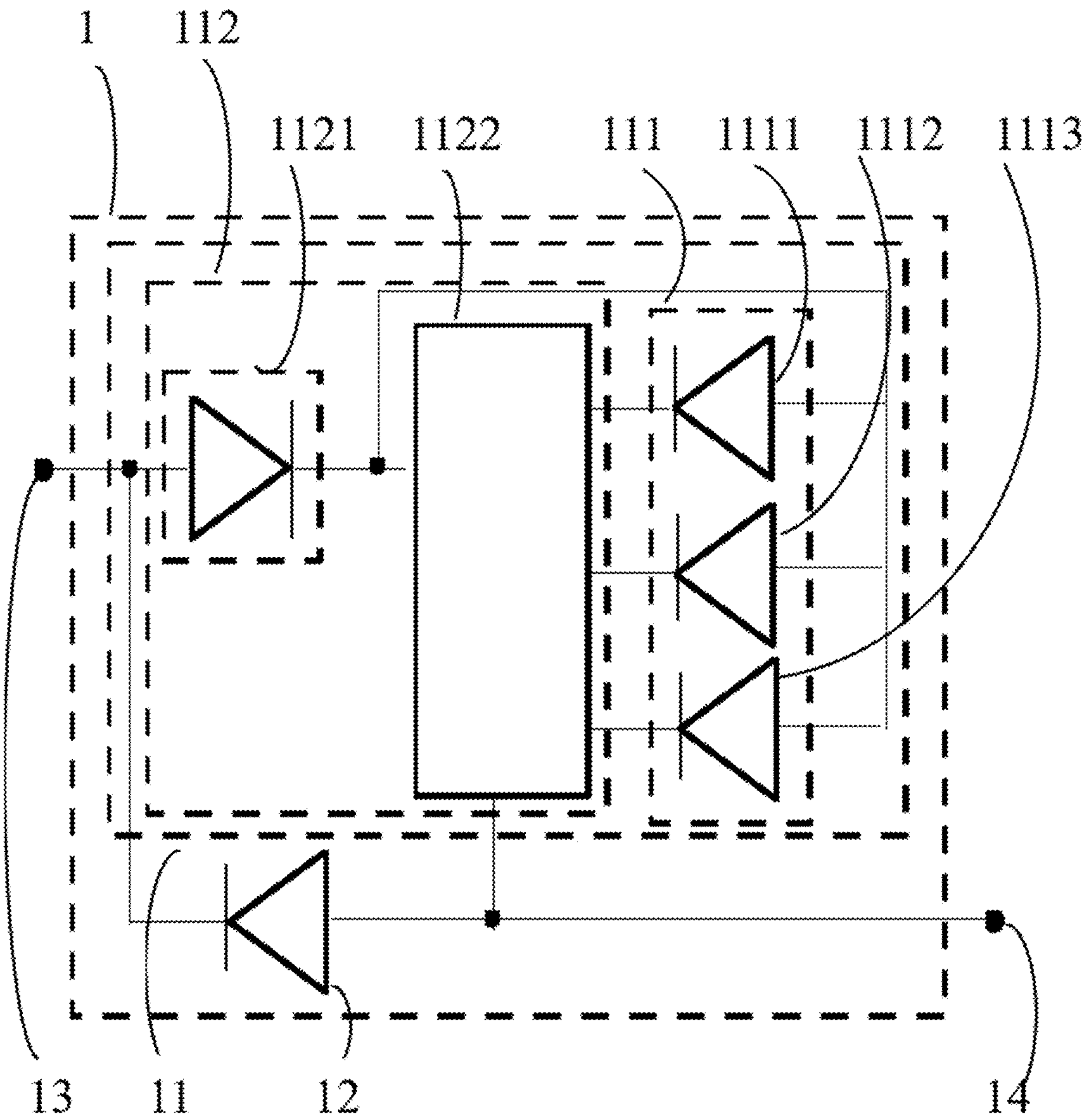
FIG. 1 illustrates a bidirectionally illuminating light source triggered by power-line pulse signals provided in Embodiment 1.

As shown in FIG. 1, the present embodiment provides a bidirectionally illuminating light source triggered by power-line pulse signals (1), comprising: a first light emitting module triggered by power-line pulse signals (11) and a reverse light emitting module (12), the first light emitting module triggered by power-line pulse signals (11) and the reverse light emitting module (12) being connected in parallel between the first port (13) and the second port (14) of the power lines of the light source; the first light emitting module triggered by power-line pulse signals (11) includes an LED color light group (111) and an LED driver (112) for driving the LED color light group (111) based on the power-line pulse signals loaded on the power lines; when the voltage level of the first port (13) of the power lines is higher than that of the second port (14), the LED driver (112) drives the LED color light group (111) based on the power-line pulse signals loaded on the power lines; when the voltage level of the first port (13) of the power lines is lower than that of the second port (14), the reverse light emitting module (12) works.

The LED driver (112) comprises: a reverse current blocking module (1121) and an operation module triggered by power-line pulse signals (1122); The input of the reverse current blocking module (1121) is connected to the first port (13) of the power lines, and the output of the reverse current blocking module (1121) is connected to the operation module triggered by power-line pulse signals (1122). The operation module triggered by power-line pulse signals (1122) drives the LED color light group (111) based on the operation result.

In this embodiment, the LED color light group (111) is connected in common anode configuration and comprises a red LED (1111), a green LED (1112), and a blue LED (1113). The cathodes of the red LED (1111), the green LED (1112), and the blue LED (1113) are respectively connected to the output of the operation module triggered by power-line pulse signals (1122), and the anodes of the red LED (1111), the green LED (1112), and the blue LED (1113) are connected in common to the output of the reverse current blocking module.

In this embodiment, the reverse current blocking module (1121) is a diode, with the anode of the diode connected to the first port (13) of the power lines, and the cathode of the diode connected to the operation module triggered by power-line pulse signals (1122).

Figure 2:
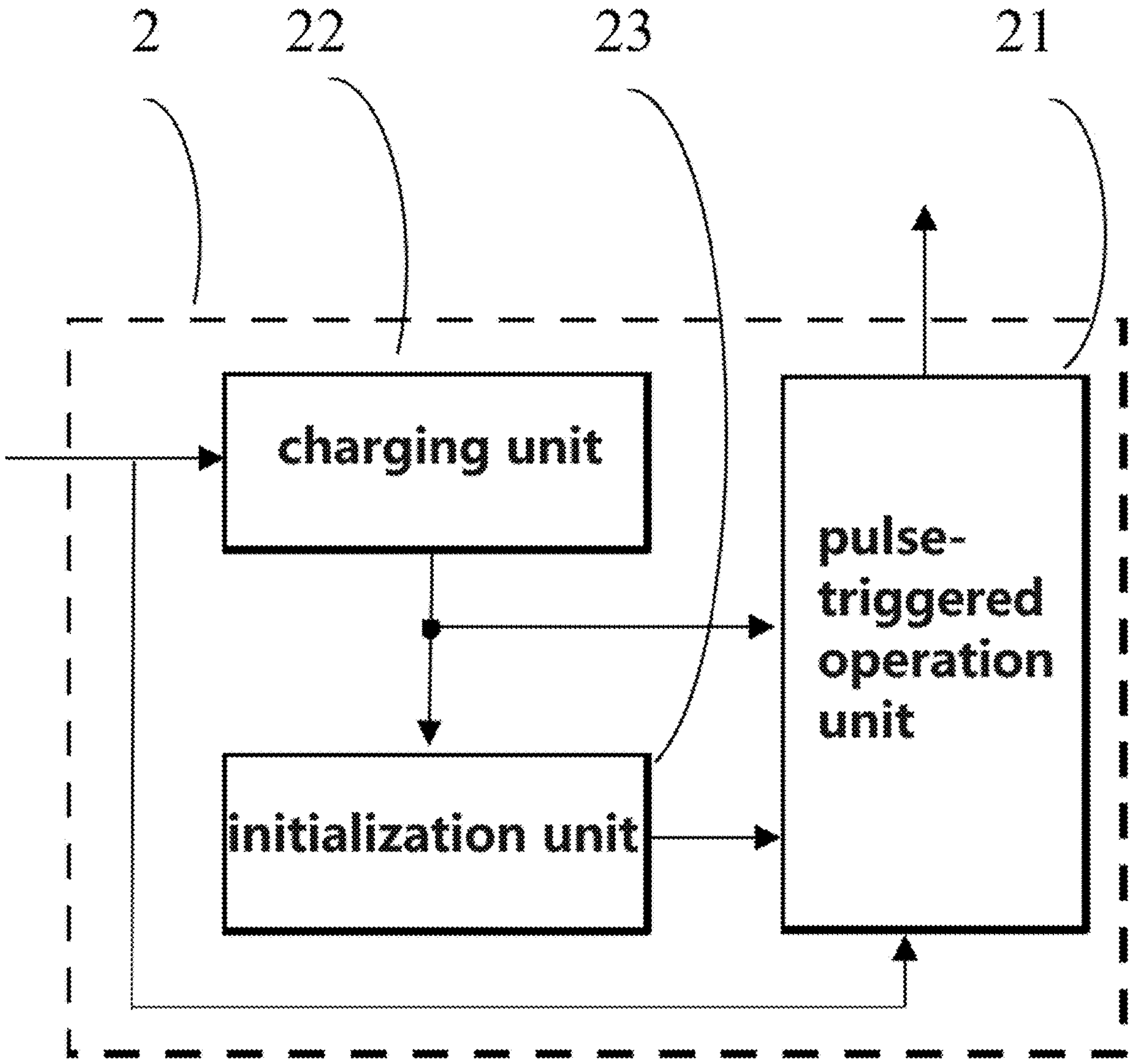
FIG. 2 illustrates an operation module triggered by power-line pulse signals in Embodiment 1.

In this embodiment, as shown in FIG. 2, the operation module triggered by power-line pulse signals (2, 1122) comprises: a pulse-triggered operation unit (21) for performing operations based on the pulse signals from the power lines and outputting the operation result; a charging unit (22) for providing power supply level to the pulse-triggered operation unit based on the pulse signals from the power lines, charging when the pulse signals is high, and discharging when the pulse signals is low; and an initialization unit (23) for initializing the pulse-triggered operation unit based on the power supply level.

The operation module triggered by power-line pulse signals (2, 1122) in this embodiment performs pulse counting operation triggered by the pulse signals and drives the color light group (111) based on the operation result.

In this embodiment, the reverse current blocking module (1121) and the operation module triggered by power-line pulse signals (1122) are integrated in a same integrated circuit.

In this embodiment, the reverse light emitting module (12) is a warm white LED, with the anode connected to the second port (14) of the power lines and the cathode connected to the first port (13) of the power lines.

Figure 3:
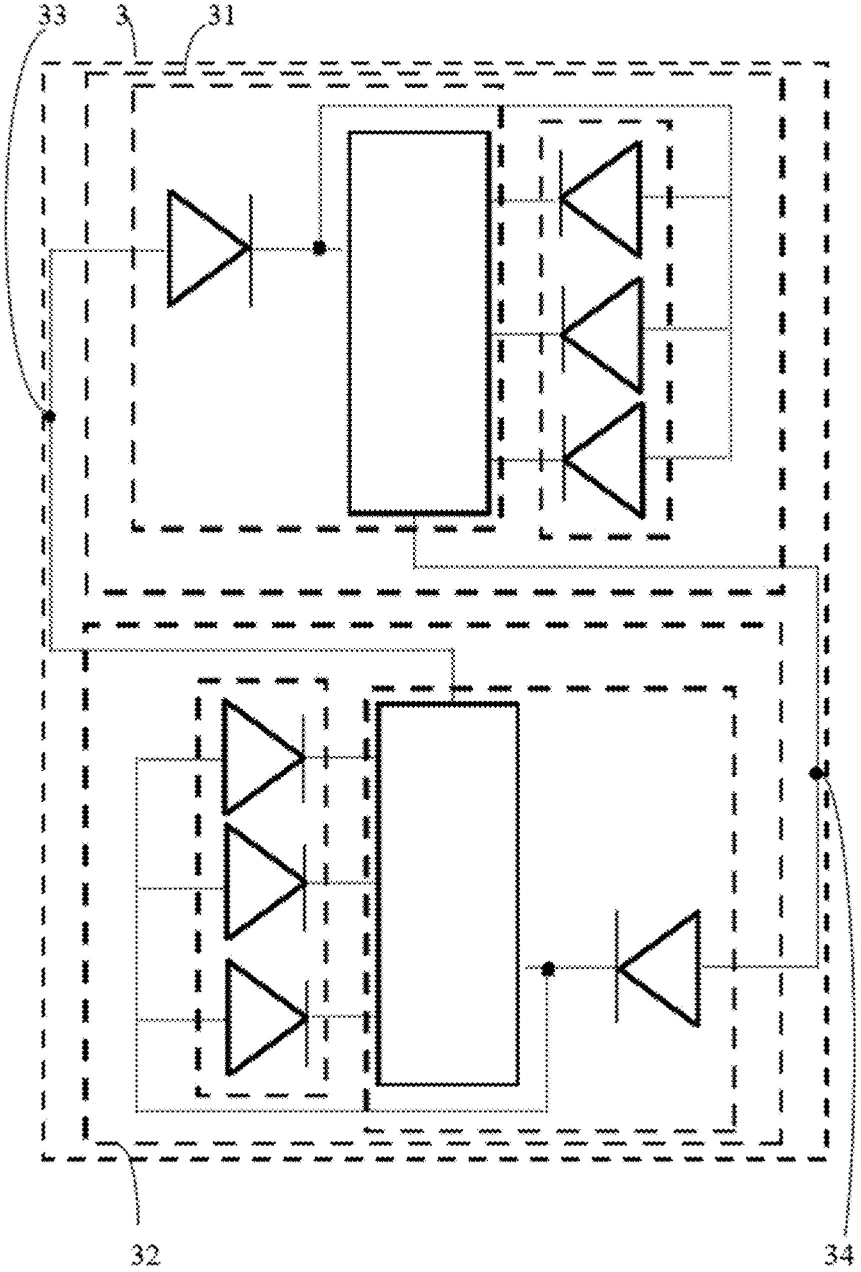
FIG. 3 illustrates another type of bidirectional emitting power-line pulse-triggered light source.

As shown in FIG. 3, another embodiment of a bidirectionally illuminating light source triggered by power-line pulse signals (3) comprises a first light-emitting module triggered by power-line pulse signals (31) and a reverse light emitting module (32), which are connected in parallel between the first port (33) and the second port (34) of the power lines of the light source. In this embodiment, the reverse light emitting module (32) is a second light-emitting module triggered by power-line pulse signals. When the voltage level of the first port (33) of the power lines is lower than that of the second port (34), the second light-emitting module triggered by power-line pulse signals drives the LED color light group based on the power-line pulse signals loaded on the power lines.

Figure 4:
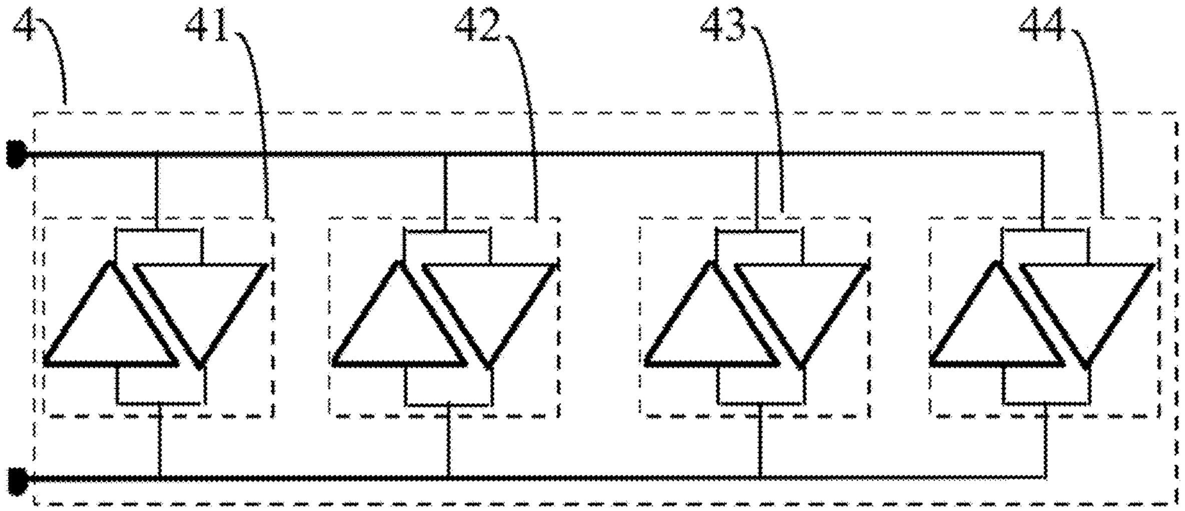
FIG. 4 shows a bidirectional emitting light string triggered by power-line pulses (fully parallel).

As shown in FIG. 4, the present invention also provides a bidirectional emitting light string triggered by power-line pulses (4), which comprises four fully parallel bidirectional light sources: bidirectional light source (41), bidirectional light source (42), bidirectional light source 43, and bidirectional light source (44). The bidirectional light sources can be the bidirectionally illuminating light source triggered by power-line pulse signals (1) or the bidirectionally illuminating light source triggered by power-line pulse signals (3) as described above.

Figure 5:
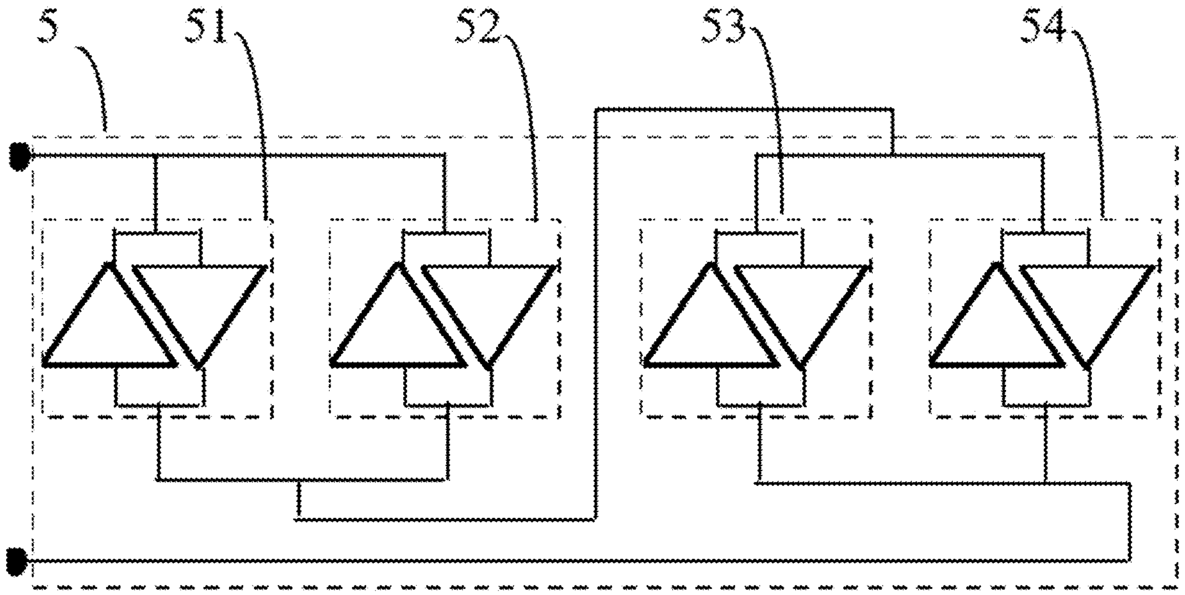
FIG. 5 shows another type of bidirectional emitting light string triggered by power-line pulses (parallel-series).

As shown in FIG. 5, another embodiment of the present invention is a bidirectional emitting light string triggered by power-line pulses (5), which comprises four bidirectional light sources: bidirectional light source (51), bidirectional light source (52), bidirectional light source (53), and bidirectional light source (54). The parallel bidirectional light source (51) and bidirectional light source (52) are connected in series with the parallel bidirectional light source (53) and bidirectional light source (54). The bidirectional light sources can be the bidirectionally illuminating light source triggered by power-line pulse signals (1) or the bidirectionally illuminating light source triggered by power-line pulse signals (3) as described above.

Figure 6:
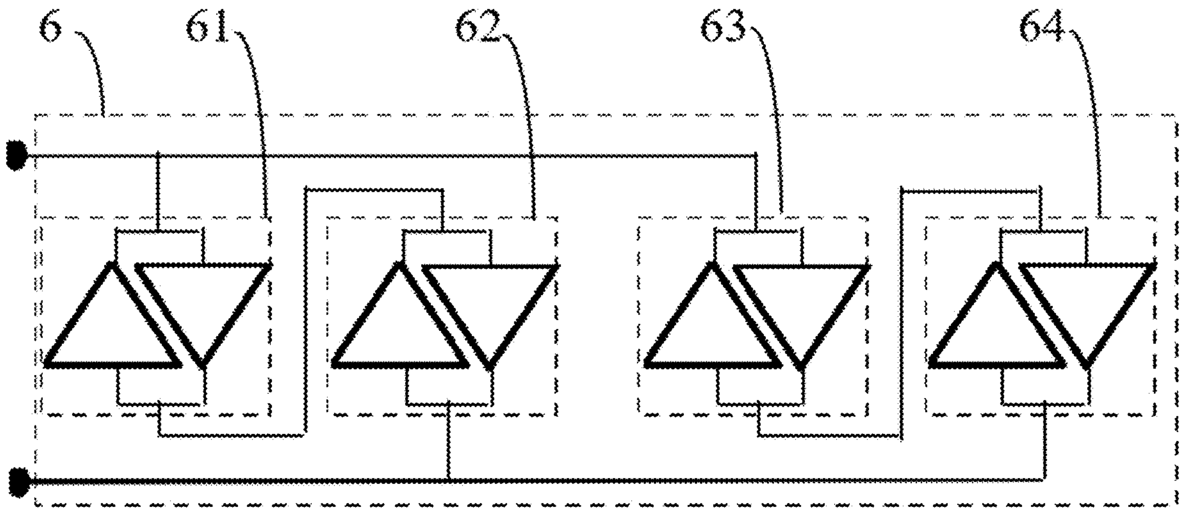
FIG. 6 shows another type of bidirectional emitting light string triggered by power-line pulses (series-parallel).

As shown in FIG. 6, another embodiment of the present invention is a bidirectional emitting light string triggered by power-line pulses (6), which comprises four bidirectional light sources: bidirectional light source (61), bidirectional light source (62), bidirectional light source (63), and bidirectional light source (64). The serially connected bidirectional light source (61) and bidirectional light source (62) are connected in parallel with the serially connected bidirectional light source (63) and bidirectional light source (64). The bidirectional light sources can be the bidirectionally illuminating light source triggered by power-line pulse signals (1) or the bidirectionally illuminating light source triggered by power-line pulse signals (3) as described above.

Figure 7:
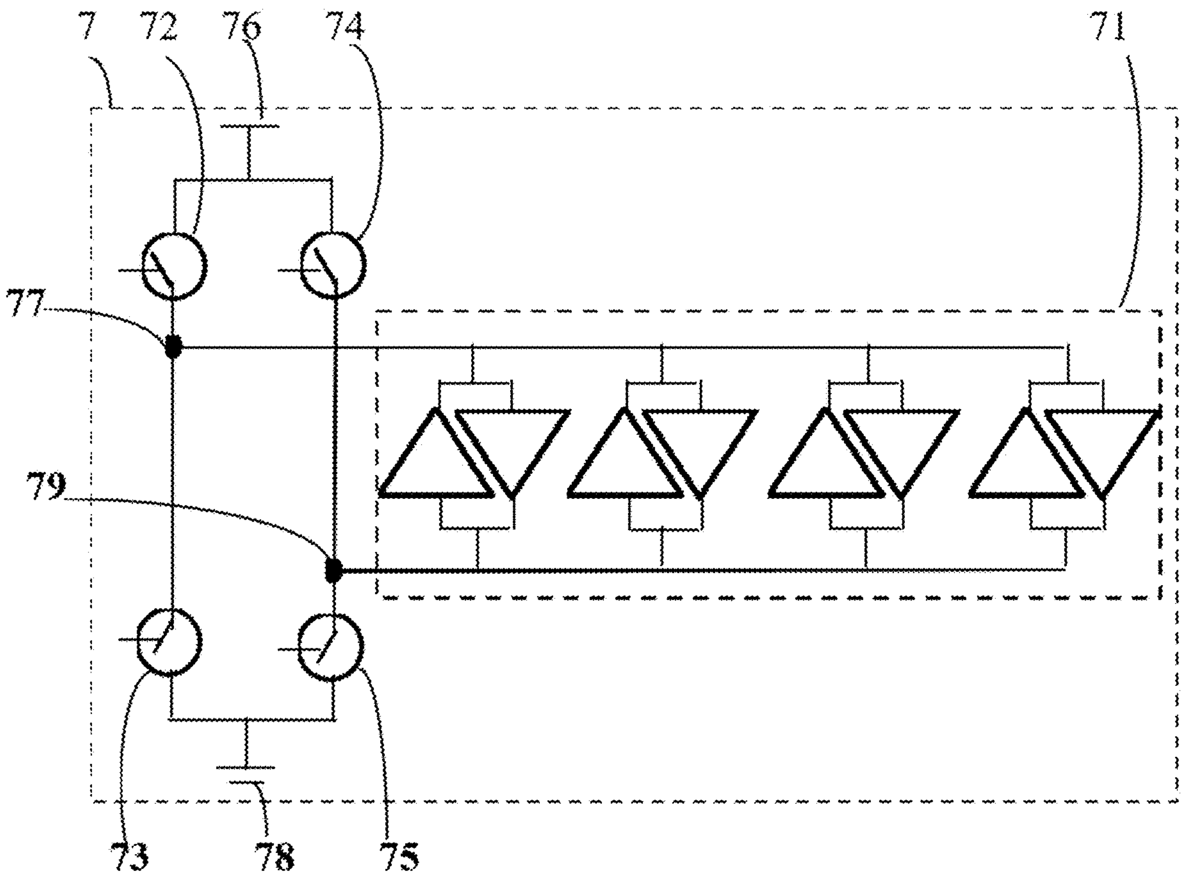
FIG. 7 shows a bidirectional emitting power-line pulse-triggered control apparatus.

As shown in FIG. 7, the present invention also provides a bidirectional emitting control apparatus triggered by power-line pulses (7), which comprises a bidirectional emitting light string triggered by power-line pulses (71), a first controllable switch (72), a second controllable switch (73), a third controllable switch (74), and a fourth controllable switch (75).

The first controllable switch (72), the second controllable switch (73), the third controllable switch (74), and the fourth controllable switch (75) are controlled by a control circuit, which is not shown in this embodiment.

The input port of the first controllable switch (72) is connected to a DC power supply (76), the output port of the first controllable switch (72) is connected to the first port (77) of the bidirectional emitting light string triggered by power-line pulses, and the control port of the first controllable switch (72) is connected to the control circuit.

The output port of the second controllable switch (73) is connected to the first port (77) of the bidirectional emitting light string triggered by power-line pulses, the input port of the second controllable switch (73) is connected to ground (78), and the control port of the second controllable switch (73) is connected to the control circuit.

The input port of the third controllable switch (74) is connected to the DC power supply (77), the output port of the third controllable switch (74) is connected to the second port (79) of the bidirectional emitting light string triggered by power-line pulses, and the control port of the third controllable switch (74) is connected to the control circuit.

The output port of the fourth controllable switch (75) is connected to the second port (79) of the bidirectional emitting light string triggered by power-line pulses, the input port of the fourth controllable switch (75) is connected to ground (78), and the control port of the fourth controllable switch (75) is connected to the control circuit.

In this embodiment, when the second controllable switch (73) and the third controllable switch (74) are turned off and the first controllable switch (72) is turned on, the control circuit controls the fourth controllable switch (75) to turn on and off to control the first light-emitting module triggered by power-line pulse signals of the bidirectional emitting light string triggered by power-line pulses (71). When the first controllable switch (72) and the fourth controllable switch (75) are turned off and the second controllable switch (73) and the third controllable switch (74) are turned on, the reverse light emitting module of the bidirectional emitting light string triggered by power-line pulses (71) is activated.

In this embodiment, the bidirectional emitting light string triggered by power-line pulses (71) can be the bidirectional emitting light string triggered by power-line pulses (5), the bidirectional emitting light string triggered by power-line pulses (6) or the bidirectional emitting light string triggered by power-line pulses (7) as described above.

Figure 8:
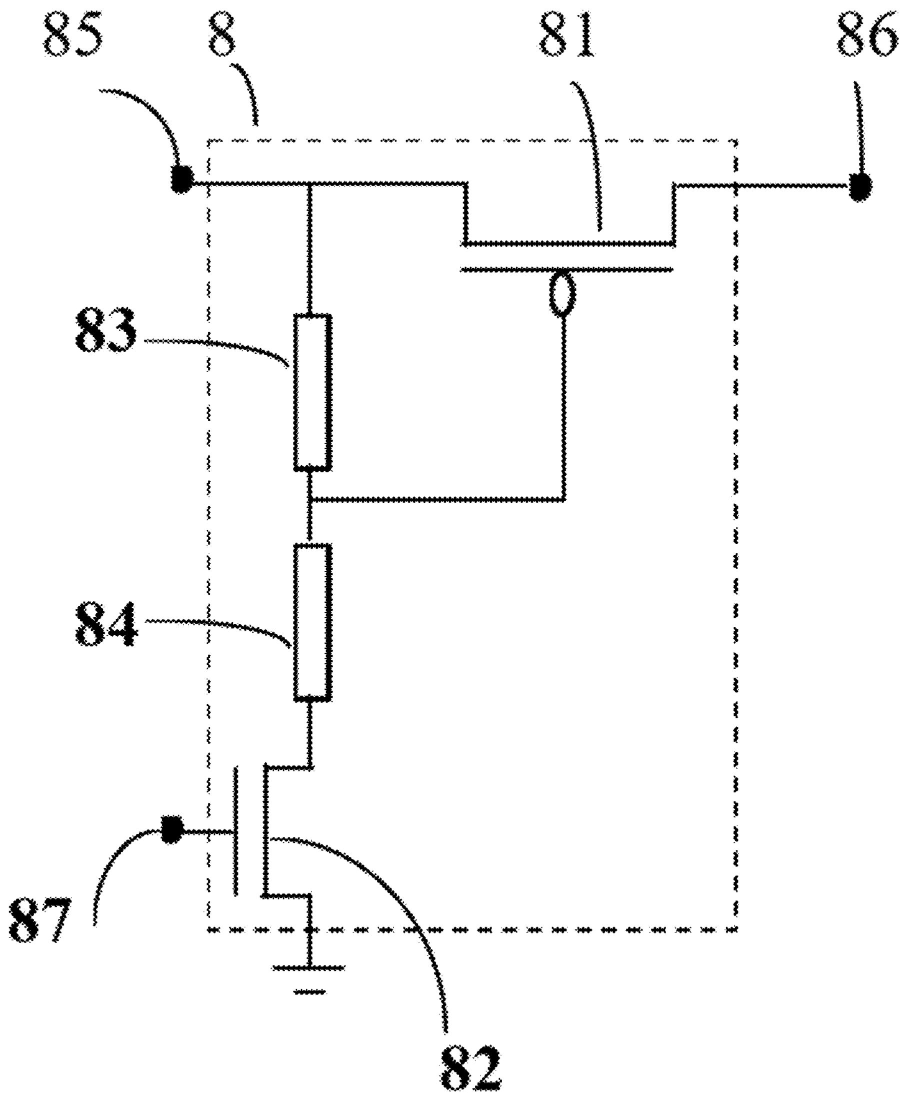
FIG. 8 shows another type of bidirectional emitting power-line pulse-triggered control apparatus.

In this embodiment, the first controllable switch (72) and the third controllable switch (74) are a controllable switch module (8) as shown in FIG. 8, and the second controllable switch (73) and the fourth controllable switch (75) are NMOS devices. The drain of NMOS device serves as the output port of the second controllable switch (73)/fourth controllable switch (75), the source of NMOS device serves as the input port of the second controllable switch (73)/ fourth controllable switch (75), and the gate of NMOS device serves as the control port of the second controllable switch (73)/fourth controllable switch (75).

As shown in FIG. 8, the controllable switch module (8) comprises a PMOS P1 (81), an NMOS N1 (82), a resistor R1 (83), and a resistor R2 (84). The source of the PMOS P1 (81) serves as the input port (85) of a controllable switch module, and the drain of the PMOS P1 (81) serves as an output port (86) of the controllable switch module. The source of the PMOS P1 (81) is connected to one port of the resistor R1 (83), and the other port of the resistor R1 (83) is connected to the gate of the PMOS P1 (81) and one port of the resistor R2 (84). The other port of the resistor R2 (84) is connected to the drain of the NMOS N1 (82). The gate of the NMOS N1 (82) serves as the control port (87) of a controllable switch module, and the source of the NMOS N1 (82) is connected to ground. In this embodiment, the resistor R1 (83) is 1 k ohm, and the resistor R2 (84) is 1 k ohm.

The LED color light groups of different color systems are drove by the first bidirectionally illuminating light source triggered by power-line pulse signals and the second bidirectionally illuminating light source triggered by power-line pulse signals, thereby obtaining a wide spectrum of light effects. Compared with some implementations, a spectral range is obtained by forward current while the light source is triggered to performs operations by the pulse signals input from the power lines. Another spectral range is obtained by reverse current, greatly increasing the spectral range of the light source with only two power wires.

The invention claimed is:

1. A bidirectionally illuminating light source triggered by power-line pulse signals, the light source comprising:

a first light emitting module triggered by the power-line pulse signals loaded on power lines; and a reverse light emitting module connected in parallel with the first light emitting module, between a first port and a second port of the power lines;

wherein the first light emitting module comprises an LED color light group, and an LED driver configured to drive the LED color light group according to the power-line pulse signals;

when a voltage level of the first port of the power lines is higher than a voltage level of the second port, the LED driver drives the LED color light group according to the power-line pulse signals;

when the voltage level of the first port of the power lines is lower than the voltage level of the second port, the reverse light emitting module operates.

2. The light source of claim 1, wherein, the LED driver comprises a reverse current blocking module; and an operation module triggered by the power-line pulse signals.

3. The light source of claim 1, wherein the reverse light-emitting module comprises a plurality of LEDs.

4. The light source of claim 1, wherein, the reverse light-emitting module is a second light-emitting module;

when the voltage level of the first port of the power lines is lower than the voltage level of the second port of the power lines, the second light-emitting module is driven by the power-line pulse signals loaded on the power lines, and drives an LED color light group of the second light-emitting module.

5. The light source of claim 4, wherein the LED color light group of the second light-emitting module is in a different color series from that of the LED color light group of the first light-emitting module.

6. A bidirectional emitting light string triggered by power-line pulses, comprising a plurality of light sources according to claim 1, wherein the plurality of light sources are connected to a first port of the light string and a second port of the light string;

the plurality of light sources are connected in parallel, in a series-parallel structure, or in a parallel-series structure.

7. The light source of claim 1, wherein the LED driver comprises a reverse current blocking module; and an operation module triggered by the power-line pulse signals;

wherein the reverse current blocking module and the operation module are integrated in a same integrated circuit.

8. The light source of claim 7, wherein an input of the reverse current blocking module is connected to the first port of the power lines, and an output of the reverse current blocking module is connected to the operation module; and wherein the operation module is configured to drive the LED color light group according to an operation result of the operation module.

9. A bidirectionally illuminating light source triggered by power-line pulse signals, the light source comprising:

a first light emitting module triggered by the power-line pulse signals loaded on power lines; and a reverse light emitting module connected in parallel with the first light emitting module, between a first port and a second port of the power lines;

wherein the first light emitting module comprises an LED color light group, and an LED driver configured to drive the LED color light group according to the power-line pulse signals;

when a voltage level of the first port of the power lines is higher than a voltage level of the second port, the LED driver drives the LED color light group according to the power-line pulse signals;

when the voltage level of the first port of the power lines is lower than the voltage level of the second port, the reverse light emitting module operates;

wherein, the LED driver comprises a reverse current blocking module; and an operation module triggered by the power-line pulse signals;

an input of the reverse current blocking module is connected to the first port of the power lines, and an output of the reverse current blocking module is connected to the operation module; and wherein the operation module is configured to drive the LED color light group according to an operation result of the operation module;

wherein, the reverse current blocking module is a unidirectional conducting module;

the reverse current blocking module is conducting when an input voltage of the reverse current blocking module is higher than an output voltage of the reverse current blocking module, and the reverse current blocking module is turned off when the input voltage of the reverse current blocking module is lower than the output voltage of the reverse current blocking module.

10. The light source of claim 9, wherein, the unidirectional conducting module is a diode having an anode connected to the first port of the power lines and a cathode connected to the operation module;

alternatively, the unidirectional conducting module is an equivalent diode formed by an NPN transistor having a collector and a base connected to the first port of the power lines, and an emitter connected to the operation module;

alternatively, the unidirectional conducting module is an equivalent diode formed by a PNP transistor having a collector and a base connected to the operation module, and an emitter connected to the first port of the power lines.

11. The light source of claim 10, wherein the reverse current blocking module and the operation module are integrated in a same integrated circuit.

12. The light source of claim 11, wherein a low level of the power-line pulse signals is equal to the voltage level of the second port of the power lines.

13. The light source of claim 11, wherein a low level of the power-line pulse signals is a third voltage level that is higher than the voltage level of the second port and lower than the voltage level of the first port.

14. The light source of claim 11, wherein the operation module is configured to perform computation triggered by the pulse signals, and drive the LED color light group according to computation results.

15. The light source of claim 14, wherein the operation module is configured to perform arithmetic operations, logical operations, or a combination of both.

16. The light source of claim 14, wherein the operation module is configured to perform pulse counting computation triggered by the pulse signals.

17. The light source of claim 11, wherein the operation module is configured to perform encoding and decoding computation triggered by the pulse signals, with a pulse width of high or low levels corresponding to encoded information.

18. The light source of claim 17, wherein different lengths of high levels, or different lengths of low levels, or combinations of different lengths of high and low levels, represent different logical encoding information.

19. The light source of claim 11, wherein the operation module is configured to perform modulation and demodulation computation based on a current or voltage frequency triggered by the pulse signals, and drive the LED color light group according to results from the modulation and demodulation computation.

20. A bidirectional emitting control apparatus triggered by power-line pulses, comprising:

a bidirectional emitting light string comprising a plurality of light sources each comprising:

a first light emitting module triggered by the power-line pulse signals loaded on power lines; and a reverse light emitting module connected in parallel with the first light emitting module, between a first port and a second port of the power lines;

wherein the first light emitting module comprises an LED color light group, and an LED driver configured to drive the LED color light group according to the power-line pulse signals;

when a voltage level of the first port of the power lines is higher than that a voltage level of the second port, the LED driver drives the LED color light group according to the power-line pulse signals;

when the voltage level of the first port of the power lines is lower than the voltage level of the second port, the reverse light emitting module operates;

wherein the plurality of light sources are connected to a first port of the bidirectional emitting light string and a second port of the bidirectional emitting light string; and wherein the plurality of light sources are connected in parallel, in a series-parallel structure, or in a parallel-series structure;

a first controllable switch, a second controllable switch, a third controllable switch, and a fourth controllable switch;

wherein the first controllable switch, the second controllable switch, the third controllable switch, and the fourth controllable switch are controlled by a control circuit;

an input port of the first controllable switch is connected to a DC power supply, an output port of the first controllable switch is connected to the first port of the bidirectional emitting light string, and a control port of the first controllable switch is connected to the control circuit;

an output port of the second controllable switch is connected to the first port of the bidirectional emitting light string, an input port of the second controllable switch is connected to ground, and a control port of the second controllable switch is connected to the control circuit;

an input port of the third controllable switch is connected to the DC power supply, an output port of the third controllable switch is connected to the second port of the bidirectional emitting light string triggered by power-line pulses, and a control port of the third controllable switch is connected to the control circuit;

an output port of the fourth controllable switch is connected to the second port of the bidirectional emitting light string triggered by power-line pulses, an input port of the fourth controllable switch is connected to ground, and a control port of the fourth controllable switch is connected to the control circuit.

21. The bidirectional emitting control apparatus of claim 20, wherein when the second controllable switch and third controllable switch are turned off, the control circuit controls the first controllable switch between on and off to control the first light emitting modules.

22. The bidirectional emitting control apparatus of claim 20, wherein when the first controllable switch and the fourth controllable switch are turned off, and the second controllable switch and the third controllable switch are turned on, the reverse light emitting modules operate.

23. The bidirectional emitting control apparatus of claim 20, wherein the fourth controllable switch comprises a first N-type controllable switch, a second N-type controllable switch, and a current-limiting resistor;

the first N-type controllable switch comprises a control port, an input port, and an output port; the control port of the first N-type controllable switch is electrically connected to the control circuit; the input port of the first N-type controllable switch serves as the input port of the fourth controllable switch, and the output port of the N-type controllable switch is connected to ground;

the second N-type controllable switch comprises a control port, an input port, and an output port; the control port of the second N-type controllable switch is electrically connected to the control circuit, and the output port of the second N-type controllable switch is connected to ground;

one port of the current-limiting resistor is connected to the input port of the first N-type controllable switch, and the other port of the current-limiting resistor is connected to the input port of the second N-type controllable switch.

24. The bidirectional emitting control apparatus of claim 20, wherein when the second and third controllable switches are turned off, the control circuit controls the fourth controllable switch between on and off to control the first light emitting modules.

* * * * *